United States Patent
Song et al.

(10) Patent No.: US 7,430,098 B1
(45) Date of Patent: Sep. 30, 2008

(54) PERPENDICULAR MAGNETIC RECORDING HEAD WITH DYNAMIC FLYING HEIGHT HEATING ELEMENT

(75) Inventors: Suping Song, Fremont, CA (US);
Kroum S. Stoev, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 475 days.

(21) Appl. No.: 11/112,112

(22) Filed: Apr. 22, 2005

Related U.S. Application Data

(63) Continuation-in-part of application No. 11/039,635, filed on Jan. 18, 2005, now Pat. No. 7,372,665.

(51) Int. Cl.
G11B 5/56 (2006.01)
G11B 21/24 (2006.01)
G11B 5/127 (2006.01)

(52) U.S. Cl. .............. 360/294.7; 360/125.31
(58) Field of Classification Search .......... 360/126, 360/294.7, 125.31
See application file for complete search history.

(56) References Cited

U.S. PATENT DOCUMENTS

| | | | |
|---|---|---|---|
| 5,021,906 A | 6/1991 | Chang et al. | |
| 5,712,463 A | 1/1998 | Singh et al. | |
| 5,943,189 A | 8/1999 | Boutaghou et al. | |
| 5,991,113 A | 11/1999 | Meyer et al. | |
| 6,111,724 A | 8/2000 | Santini | |
| 6,344,949 B1 | 2/2002 | Albrecht et al. | |
| 6,359,746 B1 | 3/2002 | Kakekado et al. | |
| 6,493,183 B1 | 12/2002 | Kasiraj et al. | |
| 6,501,606 B2 | 12/2002 | Boutaghou et al. | |
| 6,504,676 B1 | 1/2003 | Hiner et al. | |
| 6,529,342 B1 | 3/2003 | Feng et al. | |
| 6,570,730 B1 | 5/2003 | Lewis et al. | |

(Continued)

FOREIGN PATENT DOCUMENTS

| | | |
|---|---|---|
| JP | 03154240 A | 7/1991 |
| JP | 5-20635 | 1/1993 |
| JP | 05151734 A | 6/1993 |

OTHER PUBLICATIONS

Gordon J. Smith, "Dynamic In-Situ Measurements of Head-to-Disk Spacing", IEEE Transactions on Magnetics, vol. 35, No. 5, Sep. 1999, pp. 2346-2351.

Vladimir Nikitin, et al., "Spatial and Temporal Profiling of Protrusion in Magnetic Recording Heads", IEEE Transactions on Magnetics, vol. 40, No. 1, Jan. 2004, pp. 326-331.

R.M. Costescu, et al., "Ultra-Low Thermal Conductivity in W/Al2O3 Nanolaminates", Science, vol. 303, Issue 5660, pp. 989-990, Feb. 13, 2004.

(Continued)

*Primary Examiner*—A. J. Heinz
(74) *Attorney, Agent, or Firm*—Jonathan E. Prejean, Esq.; Burgess & Bereznak, LLP

(57) ABSTRACT

A magnetic head includes a slider having an air bearing surface (ABS) and a trailing surface, with a transducer fabricated on the trailing surface. The transducer includes an adjunct pole disposed in a first general plane, the adjunct pole having a front edge that is recessed from the ABS and a rear edge. A main pole of the transducer is formed adjacent the adjunct pole, the main pole having a write tip that extends approximately to the ABS. A write coil having a first layer of turns is disposed in a second general plane below the adjunct pole. The magnetic head further includes a heating element, a portion of the heating element being disposed in the first general plane behind the rear edge of the adjunct pole.

22 Claims, 11 Drawing Sheets

U.S. PATENT DOCUMENTS

| | | |
|---|---|---|
| 6,577,466 B2 | 6/2003 | Meyer et al. |
| 6,597,539 B1 | 7/2003 | Stupp et al. |
| 6,707,646 B2 | 3/2004 | Berger et al. |
| 6,775,103 B2 | 8/2004 | Kang et al. |
| 6,791,793 B1 | 9/2004 | Chen et al. |
| 6,813,115 B2 | 11/2004 | Van der Heijden et al. |
| 6,816,339 B1 | 11/2004 | Litvinov et al. |
| 6,822,829 B2 | 11/2004 | Minor et al. |
| 6,834,026 B2 | 12/2004 | Fullerton et al. |
| 6,847,509 B2 | 1/2005 | Yoshikawa et al. |
| 6,920,020 B2 | 7/2005 | Yamanaka et al. |
| 6,922,311 B2 | 7/2005 | Kobayashi |
| 6,934,113 B1 | 8/2005 | Chen |
| 6,992,865 B2 | 1/2006 | Thurn et al. |
| 7,023,660 B2 | 4/2006 | Hsiao et al. |
| 7,092,195 B1 | 8/2006 | Liu et al. |
| 7,133,254 B2 | 11/2006 | Hamann et al. |
| 7,154,696 B2 | 12/2006 | Nikitin et al. |
| 7,199,982 B2 | 4/2007 | Suk |
| 7,224,547 B2 | 5/2007 | Suk |
| 7,224,553 B2 | 5/2007 | Sasaki et al. |
| 7,290,324 B2 | 11/2007 | Fontana, Jr. et al. |
| 7,372,665 B1 | 5/2008 | Stoev et al. |
| 2002/0024774 A1 | 2/2002 | Berger et al. |
| 2003/0011932 A1 | 1/2003 | Mei et al. |
| 2003/0099054 A1 | 5/2003 | Kamijima |
| 2004/0051996 A1 | 3/2004 | Kautzky |
| 2004/0075940 A1 | 4/2004 | Bajorek et al. |
| 2004/0130820 A1 | 7/2004 | Ota |
| 2004/0165305 A1 | 8/2004 | Nishiyama |
| 2004/0184192 A1 | 9/2004 | Ota et al. |
| 2004/0218302 A1 | 11/2004 | Maat |
| 2004/0240109 A1 | 12/2004 | Hamann et al. |
| 2005/0013034 A1 | 1/2005 | Margulies et al. |
| 2005/0018347 A1 | 1/2005 | Hsiao et al. |
| 2005/0024775 A1 | 2/2005 | Kurita et al. |
| 2005/0088784 A1 | 4/2005 | Macken et al. |
| 2005/0117242 A1 | 6/2005 | Taguchi |
| 2005/0243473 A1 | 11/2005 | Hu et al. |
| 2006/0034013 A1 | 2/2006 | Kato et al. |
| 2006/0102956 A1 | 5/2006 | Kamarajugadda et al. |
| 2008/0030905 A1 | 2/2008 | Yamanaka et al. |

OTHER PUBLICATIONS

Institute of Electrical and Electronic Engineers, Inc. The IEEE Standard Dictionary of Electrical and Electronics Terms, sixth edition, IEEE std 100-1996.

Machtle, P., et al., "Integrated Microheaters for In-Situ Flying Height Control of Sliders Used in Hard-Disk Drives", The 14th IEEE International Conference on Micro Electro Mechanical Systems, Meeting Date: Jan. 21, 2001-Jan. 25, 2001, MEMS 2001, pp. 196-199.

|  | Nichrome V | Manganin | Constanta |
|---|---|---|---|
| Composition | Ni80/Cr20 | Cu86/Mn12/Ni2 | Cu55/Ni45 |
| Resistivity (μΩ-cm) | 108 | 43-46 | 52 |
| TCR (1/°C) X $10^{-5}$ | 5 | 1 | +/- 2 |
| CTE (1/°C) X $10^{-6}$ | 14 | 14-19 | 14.9 |
| Thermal Conductivity (W/mK) | 13.4 | 22 | 19.5 |

FIG. 5

| Heater Element | DT Reader | Power (mW) | Stress (Mpa) |
|---|---|---|---|
| 40 | 14.4 | 50 | 58 |
| 41 | 12.0 | 65 | 73 |
| 43 | 11.7 | 76 | 61 |

FIG. 6

| Heater Element | DT Reader | Power (mW) | Stress (Mpa) |
|---|---|---|---|
| 41 | 11.9 | 70 | 72 |
| 43 | 11.5 | 76 | 60 |

FIG. 7

| Heater Element | DT Reader | Power (mW) | Stress (Mpa) |
|---|---|---|---|
| 42 | 12.4 | 64 | 51 |
| 44 | 12.1 | 75 | 51 |

FIG. 8

| Heater Element | DT Reader | Power (mW) | Stress (Mpa) |
|---|---|---|---|
| 42 | 11.9 | 72 | 51 |
| 44 | 11.7 | 78 | 48 |

FIG. 9

PERPENDICULAR MAGNETIC RECORDING HEAD WITH DYNAMIC FLYING HEIGHT HEATING ELEMENT

RELATED APPLICATION

The present application a continuation-in-part (CIP) application of application Ser. No. 11/039,635 filed Jan. 18, 2005, entitled, "MAGNETIC RECORDING HEAD WITH RESISTIVE HEATING ELEMENT LOCATED NEAR THE WRITE COIL", which is assigned to the assignee of the present CIP application.

FIELD OF THE INVENTION

The present invention relates generally to the field of magnetic recording; more specifically, to methods and apparatus for controlled thermal expansion of thin-film read/write transducers used in magnetic recording heads.

BACKGROUND OF THE INVENTION

Electronic data is commonly stored on discs of various types. Disc drives hold and rotate the disc while positioning a read/write head over the disc to read data from it or write data to it. The head typically comprises a read/write transducer formed on the trailing surface of a slider. When the disc media is rotated, a thin film of air forms between the disc and an air bearing surface (ABS) of the slider. During operation of the disc drive, the head is said to "fly" over the surface of the rotating media, with the ABS being disposed just above the disc surface. The thin film of air formed between the ABS and the disc surface is known as the air bearing. The very small separation distance between the transducer of the flying head and the surface of the disk is referred to as the "flying height." When the flying head is suspended above the recording disc in this manner, it can be moved over a desired concentric track of the disc to access data stored on that track.

The flying height of the head is a critical factor affecting the density of the magnetic data that can be stored on the disc. In recent years, the magnetic recording industry has strived to increase the data storage density in both longitudinal and perpendicular recording technologies by employing various techniques aimed at decreasing the average flying height of the head over the rotating magnetic media.

A perpendicular magnetic recording head differs from the more traditional longitudinal recording head in the direction of the magnetic flux orientation with respect to the magnetic disk medium. During a write operation, a perpendicular recording head directs the magnetic flux in a direction substantially normal to the surface of the magnetic disk. In contrast, the magnetic flux generated by a longitudinal recording head is generally in the plane of the surface of the magnetic disk. A perpendicular magnetic recording head with enhanced magnetic field strength is disclosed in U.S. Pat. No. 6,791,793, which is herein incorporated by reference. Perpendicular magnetic recording heads and methods of operation are also taught in U.S. Pat. Nos. 6,847,509; 6,834,026; 6,822,829; 6,816,339; and 6,813,115.

In one prior art technique for reducing the flying height of the magnetic head is to incorporate a heating element into the slider to temporarily heat a portion of the head to cause the transducer elements to move closer to the rotating disc, thereby reducing the flying height during periods of reading and writing. This allows the flying height to be low during reading and writing, and to be high at other times to enhance the durability of the head-disk interface. The technique of reducing flying height when reading and writing is commonly known as "dynamic flying height" (DFH) actuation. By way of example, U.S. Pat. No. 6,775,103 teaches a slider head having a patterned heating element which selectively heats the edge of the leading slider surface to cause the head to fly closer to the rotating disc. Similarly, U.S. Pat. No. 5,991,113 discloses a resistive heating element embedded within the slider body just ahead of the transducer. Application of power to the heating element causes the pole tips of the transducer to protrude toward the data recording surface relative to the air bearing surface of the slider, such that the flying height at the location of the transducer is reduced.

Magnetic recording heads that include a heater disposed in an overcoat layer for thermally expanding the surrounding layers, thereby adjusting the distance between the transducer device and the hard disc, are disclosed in U.S. Patent Application Publications US 2004/0184192 and US 2004/0130820. U.S. Patent Application Publication US 2004/0075940 teaches a heating element that is either physically located in the overcoat layer between the write transducer and a passivation layer, or between the read transducer and the slider body. Additionally, U.S. Patent Application Publication US 2003/0099054 discloses a thin-film magnetic head having a heater formed at a position opposite to the air-bearing surface with respect to the magnetic head elements.

Resistive heating elements have also been used in so-called "thermally assisted" magnetic recording (TAMR), wherein the magnetic material in the media is locally heated to near or above its Curie temperature in order to lower the coercivity of the recording media during writing. At ambient temperature, the coercivity is high enough for thermal stability of the recorded bits. A good example of a TAMR disk drive is found in U.S. Pat. No. 6,493,183, which discloses a thin-film write head having a resistive heater located in the write gap between the pole tips of the write head.

A variety of problems have plagued prior art head designs that utilize Joule heating elements for dynamically controlling the flying height of the read/write transducer. One problem has been excessive thermal stress caused by localized heating of the slider and transducer materials. Relatively high power to the heater is often required to produce sufficient pole tip protrusion. Other problems associated with thermal heating of slider heads include the difficulty in achieving an optimal transducer protrusion profile, overheating of the magnetoresistive reading element, deformation of the shape of the slider, and poor control over pole tip protrusion. For instance, designs that include a heater element disposed in the overcoat layer often suffer from disproportionate expansion of the overcoat material such that the overcoat material contacts the surface of the magnetic disc, thereby increasing the distance between the magnetic recording elements and the disc surface. Many of these problems may lead to deleterious consequences in prior art magnetic recording heads.

Another past approach involves controlling the flying height dynamically by applying a voltage between the flying head and the magnetic storage medium. The applied voltage controls the vertical movement of the head to increase or decrease the flying height by electrostatic forces. This technique is described in U.S. Pat. No. 6,529,342. One major drawback of the electrostatic force approach, however, is the inability to maintain precise control over the flying height. Another approach involves piezoelectric head-positioning techniques. Such techniques are disclosed in U.S. Pat. Nos. 6,577,466 and 5,943,189. A magnetic disk drive that incorporates a piezoelectric element with a resistive heater located between the read transducer and the slider body is described in U.S. Patent Application Publication US 2004/0165305. A drawback of such piezoelectric techniques, however, is that they are typically difficult to manufacture without thermally damaging the read transducer.

In yet another approach, U.S. Pat. No. 6,707,646 discloses a method and apparatus for dynamically controlling the flying behavior and height of a read/write head by manipulating the spring constant of the suspension. The spring constant is changed by locally varying the material temperature of the suspension arm using a small heater deposited on the surface of the suspension arm. This technique suffers from serious reliability and control problems.

Thus, there is an unsatisfied need for a solution to the problem of achieving a low flying height during reading/writing processes while avoiding or reducing the problems inherent in prior art DFH actuation approaches.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 5 is a table showing properties of three different materials that may be utilized as a patterned resistive heating element in accordance with an embodiment of the present invention.

FIG. 6 is a table showing performance data for several different embodiments of the present invention.

FIG. 7 is a table showing performance data for two additional embodiments of the present invention.

FIG. 8 is a table showing performance data for another two embodiments of the present invention.

FIG. 9 is a table showing performance data for two more embodiments of the present invention.

DETAILED DESCRIPTION

A magnetic head and disc drive for increased magnetic recording densities is described. In the following description, numerous specific details are set forth, such as dimensions, material types, configurations, etc., in order to provide a thorough understanding of the present invention. However, persons having ordinary skill in the magnetic recording arts will appreciate that many of these specific details may not be needed to practice the present invention.

Figure 1:
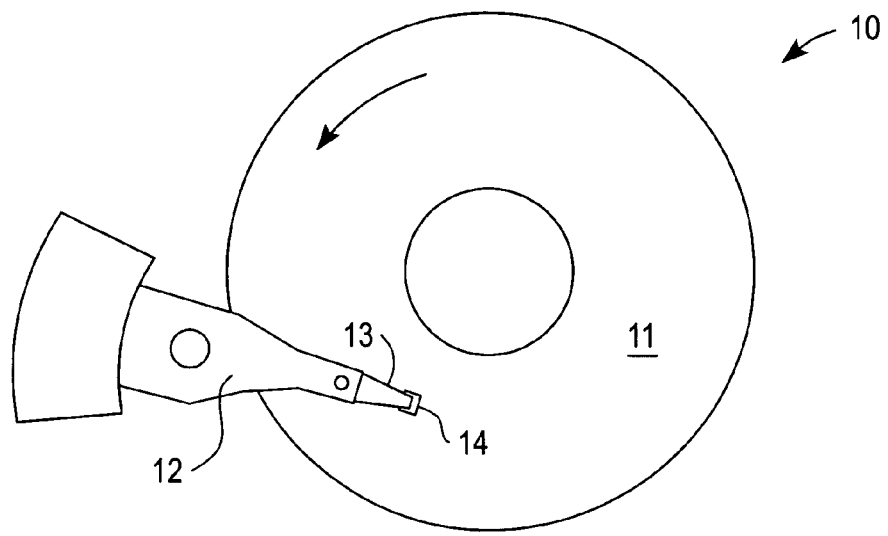
FIG. 1 is a partial top view of a disc drive in accordance with an exemplary embodiment of the present invention.
Figure 2:
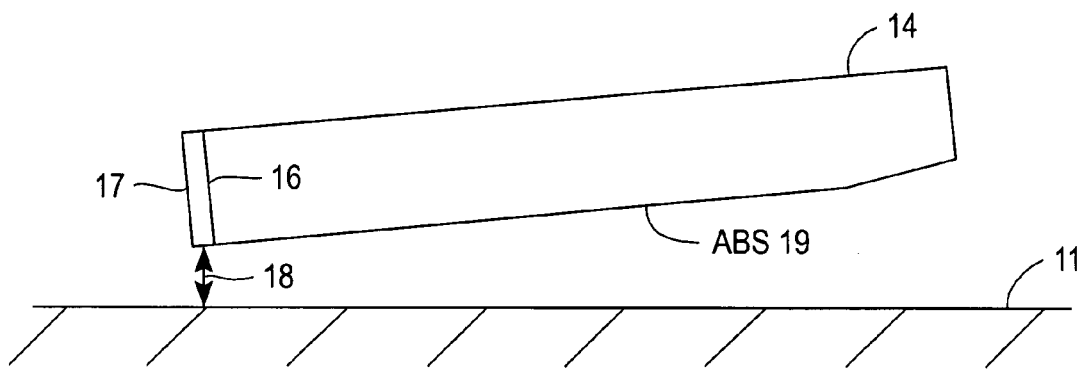
FIG. 2 is a side view of the slider head shown in FIG. 1.

Referring now to FIGS. 1 and 2, a magnetic disc drive 10 is shown including a rotating magnetic disc 11 and a head suspension assembly that supports a magnetic head comprising a slider 14 and a thin-film magnetic transducer 17 disposed on a trailing surface 16 of the slider body for reading/writing of data from/to recording tracks located on magnetic disc 11. The head suspension assembly includes a pivotally mounted actuator arm 12 and a suspension arm 13, which is attached to actuator arm 12 using any one of a number of well-known methods (such as bonding, screw mounting, swaging, etc.). Suspension arm 13 may be attached to the end of actuator arm 12 in a similar manner. Slider 14 is typically bonded to the end of suspension arm 13 using an adhesive.

When disc 11 rotates, a thin air bearing is created between the surface of magnetic disc 11 and the air-bearing surface (ABS) 19 of slider 14, which tends to separate the thin film transducer 17 from the surface of disc 11 by a tiny spacing 18 known as the "flying height".

In accordance with an exemplary embodiment of the present invention, a resistive heater element is integrated into the thin-film transducer at one or more specific locations to improve the pole tip protrusion efficiency at low power levels, while reducing or limiting temperature rise in the magnetoresistive (MR) reading element and/or thermal stress in the magnetic head constituent materials. Temporary application of power to the resistive heating element causes a correspondingly temporary expansion of at least the inductive pole tips such that the flying height of thin-film transducer 17 is temporarily reduced. By lowering the flying height of transducer a higher recording density may be achieved.

Figure 3:
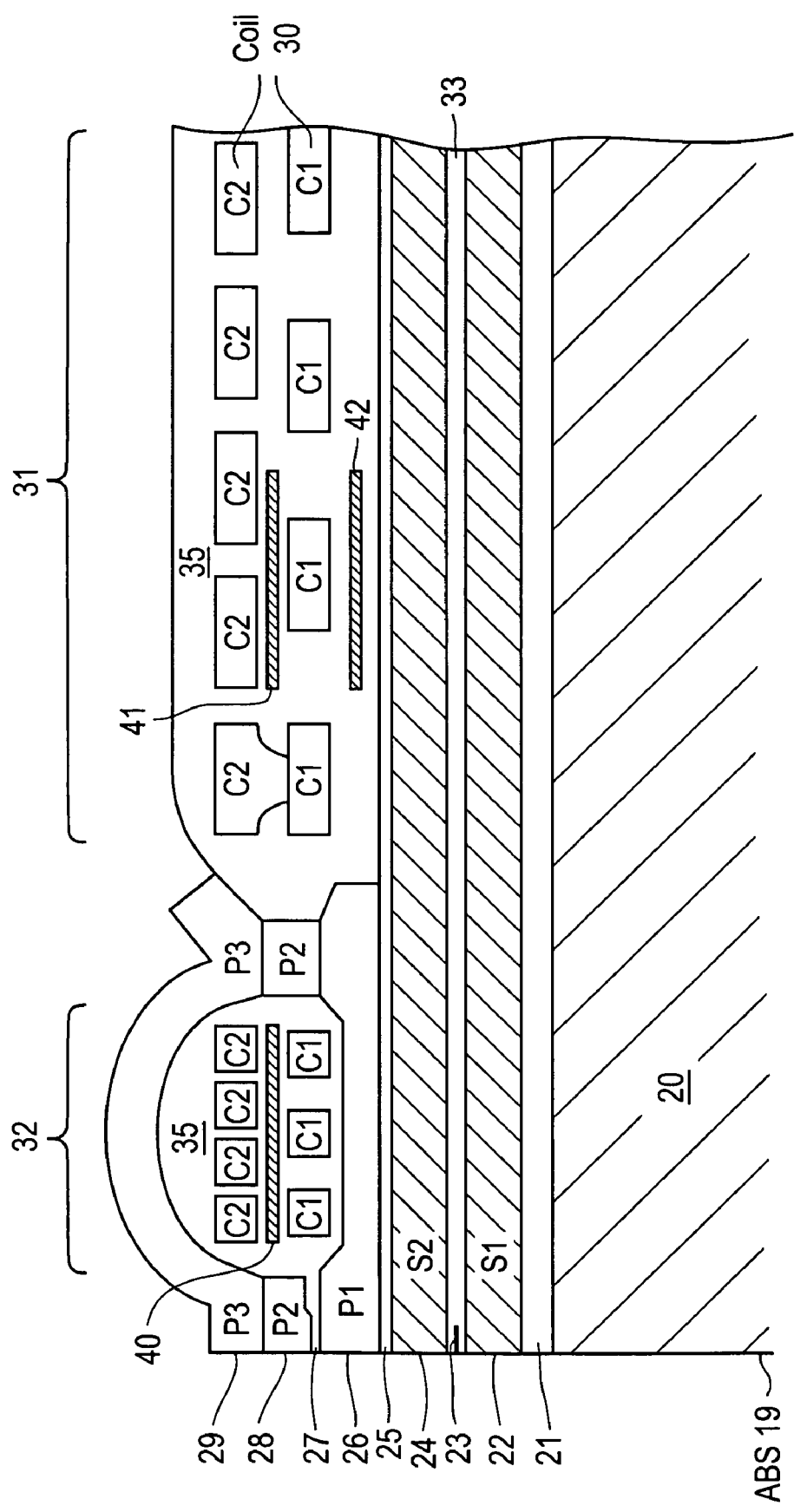
FIG. 3 is a cross-sectional side view of a thin-film transducer according to several different embodiments of the present invention.
Figure 4:
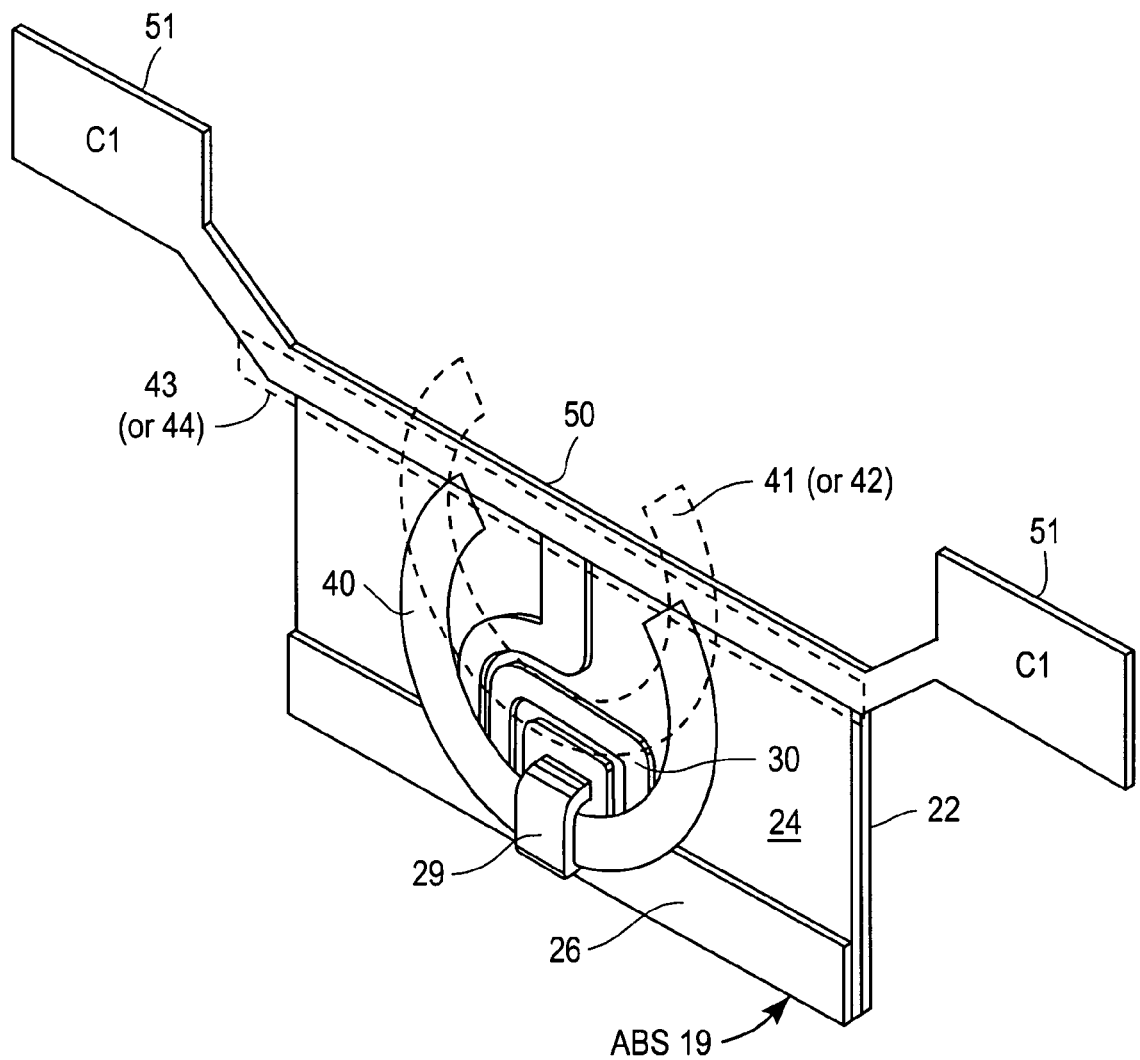
FIG. 4 is a partial perspective side view of a thin-film transducer according to several different embodiments of the present invention.

FIG. 3 is a cross-sectional side view of a thin-film transducer according to several different embodiments of the present invention. FIG. 4 is a partial perspective view of a thin-film transducer according to several different embodiments (including those depicted in FIG. 3) of the present invention. The thin-film transducers illustrated in FIGS. 3 & 4 each comprise a layered structure formed on the trailing-side surface of a slider. The thin-film transducer is constructed by layering, on top of a substrate 20, an undercoat 21 consisting of a nonmagnetic material; a lower (S1) magnetic shield layer 11 consisting of a soft magnetic material (e.g., NiFe, FeN, CoFe, etc.); a MR element 23 embedded in a nonmagnetic material layer 33, the electrical resistance of the MR element changing in response to an external magnetic field; and an upper (S2) magnetic shield layer 24 consisting of a soft magnetic material. The thin-film transducer may also include a variety of other layers.

As the component materials of the foregoing layers, for example, AlTiC ($Al_2O_3$—TiC) may be used as substrate 20; alumina ($Al_2O_3$) may be used as undercoat 21; permalloy (NiFe alloy), FeAl alloy, or a Co-base amorphous alloy as the magnetic shield layers 22 & 24; and aluminum nitride (AlN), aluminum nitrate ($AlNO_3$), or alumina as the nonmagnetic material layer 33, which is disposed between layers 22 & 24 and around MR element 23. MR element 23 may comprise any one of a number of standard materials widely known in the prior art. In the embodiments shown, MR element 23 is formed in a rectangular shape or strip with an end surface exposed at ABS 19. Information magnetically recorded in the media can be reproduced by detecting changes in the electrical resistance of MR element 23, which occur in response to the magnetic field from the magnetic recording media.

The inductive recording or writing portion of the magnetic head may comprise a layered structure which includes a first magnetic pole layer 26 consisting of a soft magnetic material; a gap layer 27 consisting of a nonmagnetic material 35 (e.g., alumina) that also surrounds the first and second turn layers (C1 & C2) of a coil 30; a second magnetic pole layer 28; and a third magnetic pole layer 29. The second and third magnetic pole layers 28 & 29 typically comprise a soft magnetic material and are connected together. One section of pole layer 26 is also connected to a section of pole layer 28. In certain alternative embodiments, pole layer 26 may extend in the same general plane beneath coil 30 (see FIG. 11).

Collectively, the first, second, and third pole layers comprise the yoke portion of the magnetic head. In the embodiment shown, coil 30 has a first set of turns 32 disposed nearest the trailing edge of ABS 19 between pole layers 26 & 29 in the yoke portion of the magnetic head. A second set of turns 31 is disposed outside of the yoke portion farther from the trailing edge of ABS 19. As can be seen, the pole tips of layers 26, 28 and 29 are exposed near ABS 19. A magnetic field can be generated across gap layer 27 by application of current to coil 30. This magnetic field can be used to invert the magnetic moment of the magnetic material layered on the surface of the magnetic recording media to record information thereon.

A thick overcoat protective layer (not shown), consisting of a nonmagnetic material, typically covers the entire thin-film transducer. In certain embodiments, a diamond-like carbon (DLC) material may also be applied to the magnetic head to protectively cover the pole tips or to enhance tribological performance by covering portions of ABS 19.

In certain embodiments of the magnetic head of the present invention, first pole layer 26 and upper shield layer 24 may be formed as a single integral layer, rather than as the two layers separated by a nonmagnetic layer 25 (typically alumina), as shown in FIG. 3.

In accordance with a first embodiment of the present invention, at least a portion of a resistive heating element 40 is located between the C1 & C2 coil layers of the first set of turns 32 of coil 30. That is, the C1 & C2 layers of coil 30 are respectively disposed in first and second general planes, and a resistive heating element 40 is disposed in a third general plane between the first and second general planes of coil 30. The first set of turns 32 is disposed nearest to ABS 19, with the second set of turns 31 being disposed farthest from ABS 19. The C1 & C2 layers are embedded within material 35, which material electrically insulates heating element 40 from the turns of coil 30. In the exemplary embodiment of FIG. 4, resistive heating element 40 is shown having a generally annular shape, e.g., like a horseshoe, with the portion illustrated in FIG. 3 being disposed nearest ABS 19, and having first and second arms that extend away from ABS 19.

In a second embodiment of the present invention, a resistive heating element 41 has at least a portion of its constituent material located between the C1 & C2 coil layers of the second set of turns 31 of coil 30. As is shown in the perspective view of FIG. 4, resistive heating element 41 also has the same general annular shape, and is located in the same general plane, as element 40 of the previous embodiment. The primary difference is that element 41 is located farther away from ABS 19. In various implementations, for example, the portion of element 41 shown in FIG. 3 (nearest the air-bearing surface) can be disposed a distance within a range of 20 μm to 60 μm from ABS 19.

In a third embodiment of the present invention, a resistive heating element 42 has the same general shape as heating element 41 and is located within the same distance range from ABS 19 as element 41 of the previous embodiment. The difference between the two embodiments, however, is that resistive heating element 42 is embedded within material 35 between upper shield layer 24 and the C1 layer of the second set of turns 31 of coil 30. Alternatively, heating element 42 may be disposed in nonmagnetic layer 25 below the second set of turns 31 of coil 30. In all other respects, resistive heating element 42 can be the same as element 41 described above.

In a fourth embodiment of the present invention, a heating element 43 comprises an elongated strip of resistive material disposed substantially over the trace of metal that comprises coil connection 50, as shown in FIG. 4. Coil connection 50 extends in a direction approximately parallel to ABS 19 and electrically connects coil 30 with a pair of terminal bond pads 51 of the C1 layer. Coil connection 50 is disposed in the same general plane as the C1 coil layer. In an alternate embodiment, the elongated resistive heating element strip is located substantially beneath coil connection 50 (denoted as element 44 in FIG. 4). In various implementations, resistive heating element 43 (or 44) is located a distance within a range of 40 μm to 120 μm from ABS 19.

Figure 10:
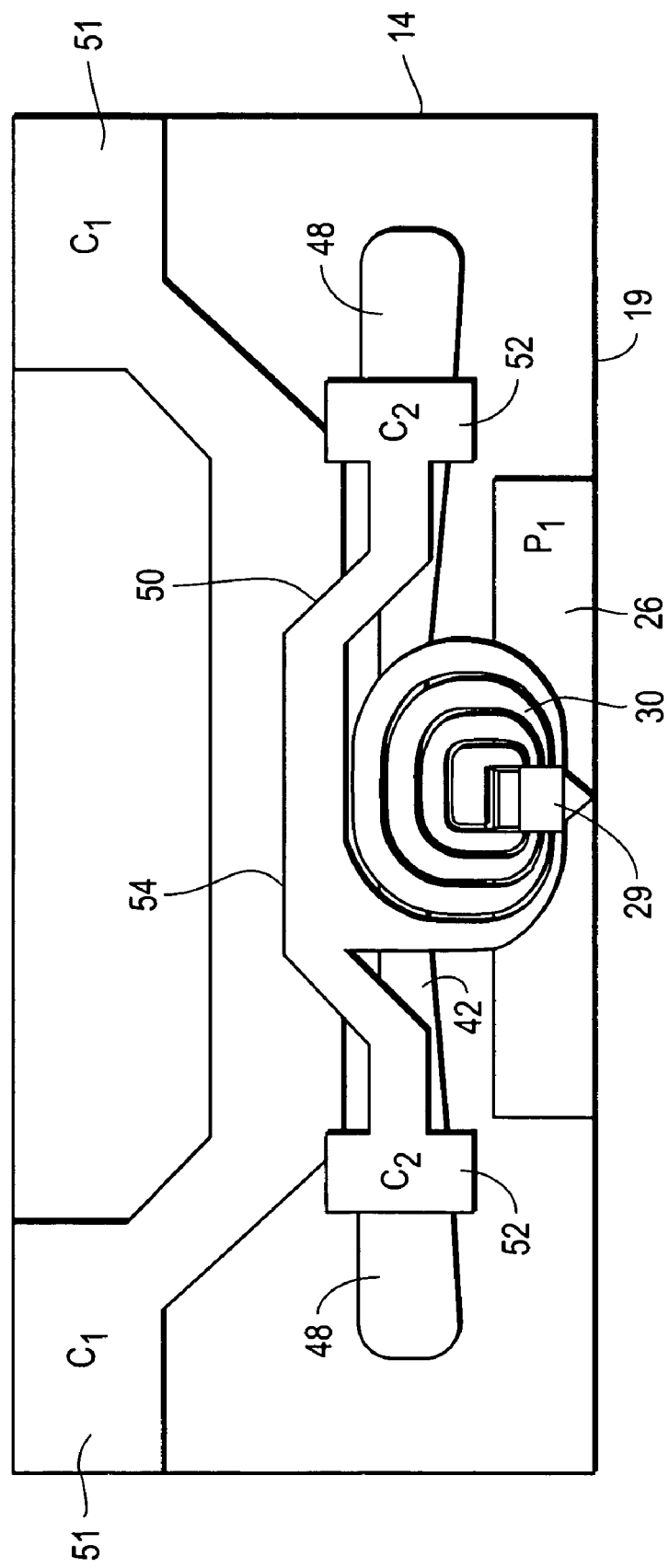
FIG. 10 is a rear side view of a magnetic head in accordance with an embodiment of the present invention.

FIG. 10 is a rear side view of a thin-film transducer formed on the trailing surface of slider body 14 in accordance with yet another alternative embodiment of the present invention. In this embodiment, resistive heating element 42 is disposed beneath the C1 & C2 layers of coil 30 and has an elongated bar shape that is tapered in the middle rather than the annular shape of the previous embodiment. (Resistive heating elements 40 and 41 discussed above and shown in FIG. 3 may also be implemented with an elongated bar shape, or a variety of other shapes.) In this view, terminal bond pads 51 of the C1 layer are clearly shown in relation to the terminal bond pads 52 of the C2 layer. Metal trace 54 electrically connects terminal bond pads 52 with the C2 layer of coil 30. Also shown in FIG. 10 are two terminal bond pads 48 that provide electrical connection with resistive heating element 42. During the manufacturing process, each of terminal bond pads 48 may be wire bonded to electrical circuitry that temporarily generates current flow through heating element 42 to heat the magnetic recording elements in order to dynamically alter the flying height characteristics of the magnetic head.

It should be understood that even though FIGS. 3 & 4 illustrate multiple heater elements, each of the embodiments described above comprises a thin-film transducer structure having a single heater element. In other words, each of the embodiments disclosed above includes one of the heater elements 40, 41, 42, 43, or 44 in the various locations described. Still other alternative embodiments may include combinations of two or more of these heater elements. By way of example, one alternative embodiment may comprise heater elements 41 and 42 electrically coupled in series or parallel. Any electrically coupled combination of multiple ones of the heater elements 40, 41, 42, 43, or 44 described above is therefore considered within the scope of the present invention.

The shape, size, and materials of each of the resistive heater elements 40, 41, 42, 43, or 44 may vary greatly depending on considerations such as resistance value, layout, design parameters, target pole tip protrusion, etc. For example, in each the embodiments of FIGS. 3 & 4, a NiCr material ($Ni_{80}/Cr_{20}$ by atomic weight) may be utilized having a thickness within a range of 0.01 µm to 0.5 µm and a width within a range of 5 µm to 25 µm to produce a resistance value within a range of 50Ω to 200Ω.

The tables of FIGS. 6 & 8 show performance data of various ones of the embodiments described above, i.e., a magnetic head with a thin-film transducer that includes one of heater elements 40, 41, 42, 43, and 44 as structurally shown in FIGS. 3 & 4. The table data includes temperature rise of the MR reading element ($DT_{reader}$ in °C.), the power of the heater element (mW), and the maximum thermal stress (Mpa) generated to produce a 6 nm pole tip protrusion profile. This performance data was obtained utilizing a NiCr resistive heating element material having a thickness of about 0.1 µm, a width of approximately 10 µm, and a resistance of 140 ohms. The data of FIGS. 6 & 8 thus demonstrates that the present invention achieves an ideal protrusion profile with a relatively small increase in reader temperature, low power, and low thermal stress.

FIGS. 7 & 9 are tables showing the same performance data criteria listed above for embodiments with a thin-film transducer including one of heater elements 41, 42, 43, and 44 made of NiCr and having a thickness of 0.1 µm, but with a width of about 20 µm and a resistance of about 60 ohms.

Materials other that NiCr (e.g., tungsten) may be used for the resistive heating elements in accordance with the present invention. FIG. 5 is a table listing three materials having properties that make them suitable for use as resistive heating elements in a thin-film transducer or magnetic head fabricated in accordance with the present invention. These materials include Nichrome V ($Ni_{80}/Cr_{20}$), Manganin ($Cu_{86}/Mn_{12}/Ni_2$), and Constanta ($Cu_{55}/Ni_{45}$). Certain relevant properties are listed for each of these resistive heating element materials, including resistivity, temperature coefficient of resistivity (TCR), coefficient of thermal expansion (CTE), and thermal conductivity. In one embodiment, a suitable resistive material has one or more of the following properties: a temperature coefficient of resistivity of about $(1.5/°C.) \times 10^{-4}$ or less; a coefficient of thermal expansion of about $(2.0/°C.) \times 10^{-5}$ or less; and/or a thermal conductivity of about 10 W/mK or greater.

Figure 11:
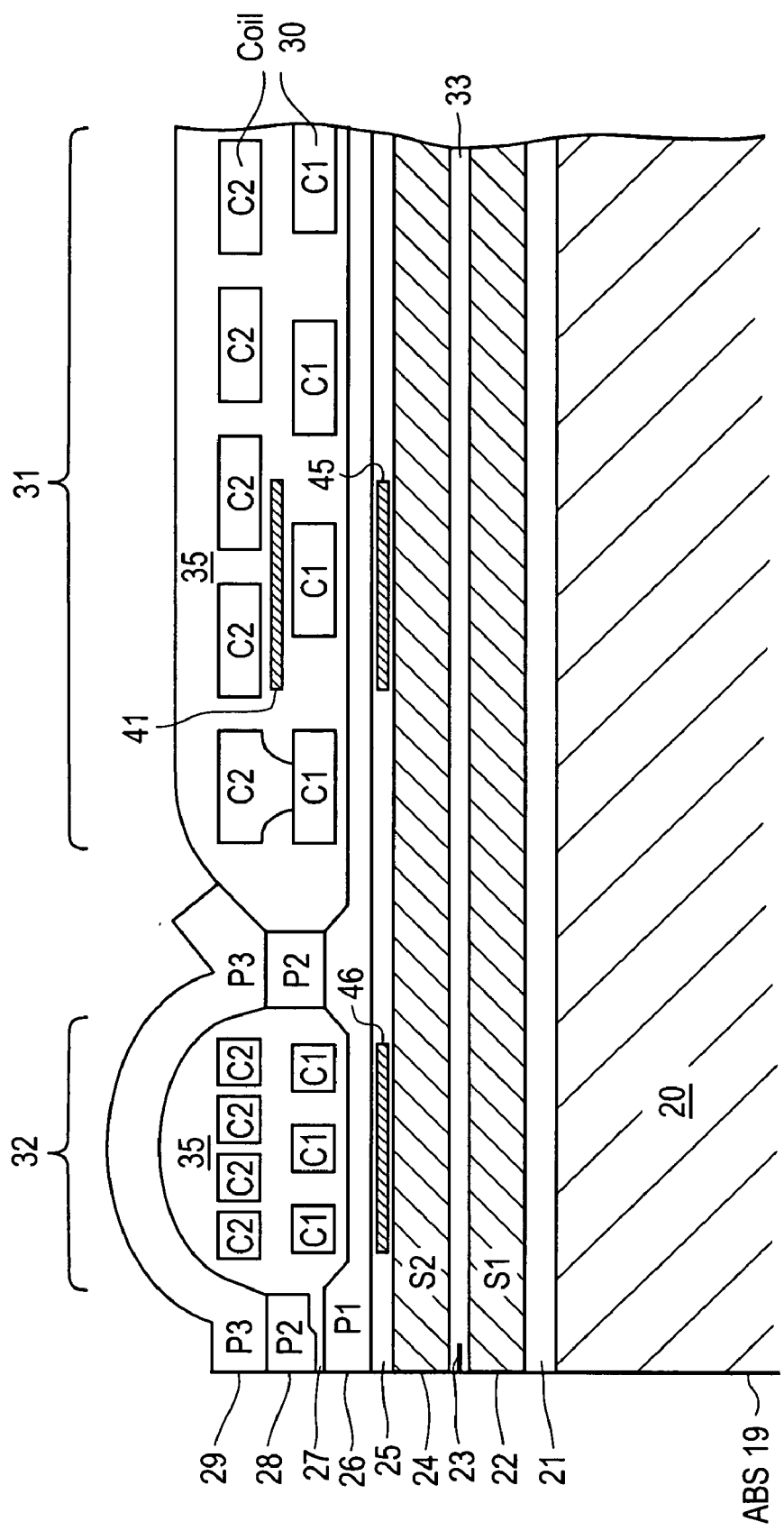
FIG. 11 is a cross-sectional side view of a thin-film transducer according to several additional embodiments of the present invention.

FIG. 11 is a cross-sectional side view that illustrates a thin-film transducer with a heater for dynamic flying height adjustment in accordance with several additional exemplary embodiments of the present invention. The layered magnetic head structure shown in FIG. 11 is basically the same as that previously depicted in FIG. 3, except that the first (P1) pole layer 26 now extends in the same general plane over nonmagnetic layer 25 to beneath the second set of turns 31 of coil 30.

In addition, a resistive heating element 45 is shown embedded within nonmagnetic layer 25 directly underneath first pole layer 26, above shield layer 24, and beneath the second set of turns 31 of coil 30. Resistive heating element 45 is electrically insulated from layers 24 & 26 by the nonmagnetic material that forms layer 25. In the embodiment shown, heating element 45 is located approximately the same distance away from ABS 19 as element 41 of the previous embodiment (i.e., 20 µm to 60 µm from the air-bearing surface). In different implementations, resistive heating element 45 may have an annular shape, an elongated, tapered bar shape, or a wide variety of other shapes not shown (e.g., serpentine, oblong, lenticular, lattice, etc.).

In another embodiment, a thin-film transducer according to the present invention includes a resistive heating element 46 disposed underneath first pole layer 26, above shield layer 24, and directly beneath the first set of turns 32 of coil 30. That is, heating element 46 is embedded within the nonmagnetic material of layer 25 directly under the yoke portion (i.e., nearest ABS 19) of the inductive recording element and above the reproducing element of the giant magnetoresistive (GMR) magnetic head of the present invention. The edge of resistive heating element 46 closest to ABS 19 is typically located a distance ranging from about 2 µm to 20 µm from ABS 19. In yet another alternative embodiment, heating element 46 is embedded in nonmagnetic material 35 beneath the C1 layer of the first set of coil turns 32 and above the first pole layer 26.

Still further embodiments may locate a resistive heating element strip within nonmagnetic layer 25 at distances from ABS 19 not shown in FIG. 11. For example, in another embodiment of the magnetic head according to the present invention, a resistive heating element may be located an intermediate position between elements 45 & 46 as shown in FIG. 11. Still other embodiments may locate the resistive heating element in layer 25 at a position closer to or farther from ABS 19 than that shown in FIG. 11.

As before, it should be understood that even though FIG. 11 illustrates multiple heater elements, each of the thin-film transducer embodiments of FIG. 11 described above comprises a structure having a single heater element. In other words, each of the embodiments disclosed in FIG. 11 includes one of the heater elements 41, 45, or 46 in the various locations described. Of course, still other embodiments may utilize two or more heating elements disposed in different locations, with the multiple heating elements being coupled either in series or in parallel.

Figure 12A:
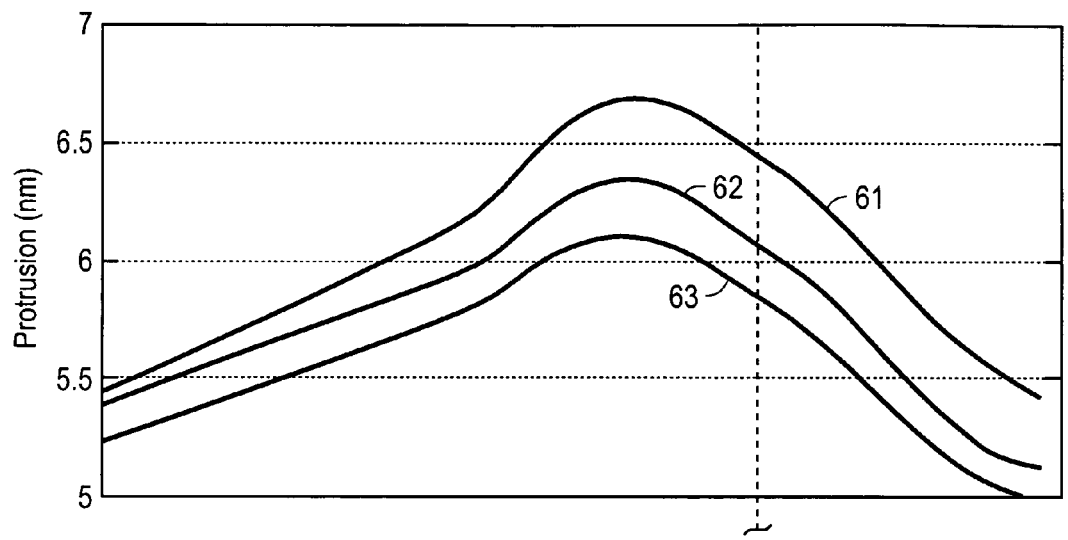
FIG. 12A is a graph that shows protrusion profiles for three different embodiments of the present invention.
Figure 12B:
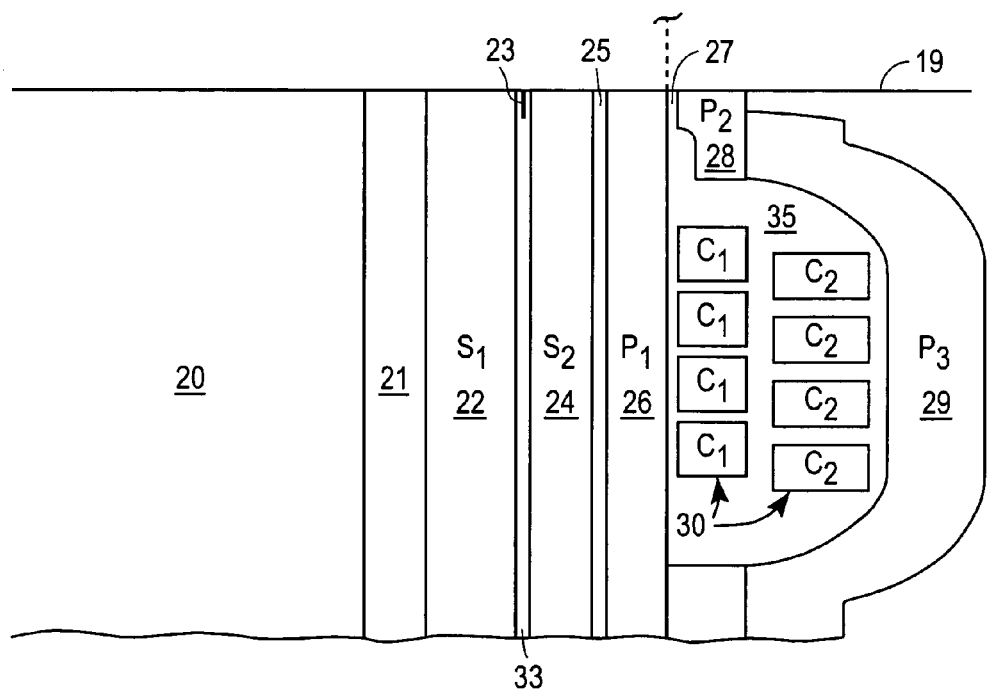
FIG. 12B is a cross-sectional side view of a thin-film transducer that illustrates various component layers in correlation to the graph of FIG. 12A.

FIG. 12A is a protrusion profile graph that shows protrusion distances of the recording and reproducing elements of a thin-film transducer according to three different embodiments of the present invention. FIG. 12B is a cross-sectional side view showing constituent layers of a thin-film transducer structure (no heating element shown) according to an embodiment of the present invention. The transducer height dimension shown horizontally in FIG. 12B corresponds to the graph of FIG. 12A such that variations in protrusion distance (in nm) can be correlated to the locations of the GMR head transducing layers and elements. As can be seen, for the three exemplary embodiments shown, a maximum protrusion occurs at a location adjacent MR element 23.

Lines 61-63 indicate the protrusion profile response to about 80 mW of power applied to a resistive heating element of a thin-film transducer in accordance with three different embodiments of the present invention. Lines 61 and 63 are the protrusion profiles produced by the embodiments shown in FIG. 11 with resistive heating element 46 and 45, respectively. Line 62 is the protrusion profile response to 80 mW of power applied to a resistive heating element disposed in layer 25 at a distance from ABS 19 halfway between that of elements 45 & 46 in the transducer structure shown in FIG. 11. To produce each of the protrusion profiles shown, the heating element may comprise an elongated, tapered bar-shaped resistive layer of NiCr approximately 0.2 µm thick, approximately 8 µm wide, and having a resistance in a range of about 50-85 ohms. In the embodiment corresponding to line 61, the edge of resistive heating element nearest to ABS 19 is about 3.5 µm from ABS 19. In the embodiment corresponding to line 63, the edge of resistive heating element nearest to ABS 19 is about 24 µm from ABS 19.

By way of further example, a target pole tip protrusion of 5.0 nm may be achieved utilizing a 50 ohm heating element 46 in a GMR head structure as described above with about 60 mW of applied power with a consequent reader temperature rise of about 11° C. The same 5.0 nm pole tip protrusion may be achieved utilizing a 50 ohm heating element 45 with about 65 mW of applied power with a consequent reader temperature rise of about 9.4° C. Protrusion efficiency increases as the resistive heating element is located closer to ABS 19. In other words, for a specific protrusion distance target, the power supply requirement decreases as the heating element is located nearer ABS 19. Greater protrusion efficiency is achieved at the cost of a slightly higher reader temperature rise due to the fact that the heating element is closer to MR element 23. Locating the heating element farther from the ABS requires slightly more power to achieve a specific protrusion profile; however, the beneficial tradeoff is a lower reader temperature rise.

Figure 13:
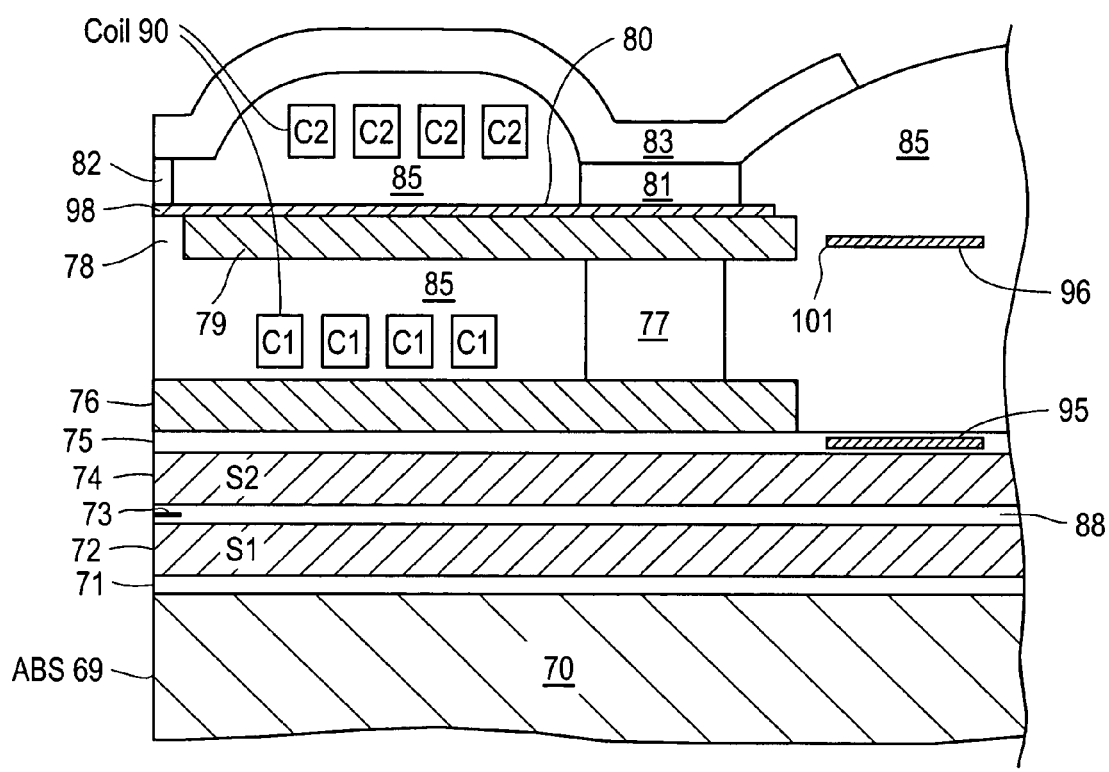
FIG. 13 is a cross-sectional side view of a perpendicular magnetic recording head according to one or more embodiments of the present invention.

With reference now to FIG. 13, a cross-sectional side view of a perpendicular magnetic recording (PMR) head is shown in accordance with one or more embodiments of the present invention. The PMR head of FIG. 13 includes a read/write transducer fabricated on the trailing surface of a slider having an ABS 69. The thin-film transducer illustrated in FIG. 13 is constructed by layering, on top of a substrate 70, an undercoat 71 consisting of a nonmagnetic material; a lower (S1) magnetic shield layer 72 consisting of a soft magnetic material (e.g., NiFe, FeN, CoFe, etc.); a MR read element 73 embedded in a nonmagnetic material layer 88; and an upper (S2) magnetic shield layer 74 consisting of a soft magnetic material. The magnetic recording (write) element of the transducer includes an optional first pole layer 76 consisting of a soft magnetic material; a nonmagnetic material 85 (e.g., alumina) that surrounds the first and second turn layers (C1 & C2) of a write coil 90; an adjunct magnetic pole layer 79; and a main magnetic pole layer 80. The first and adjunct magnetic pole layers 28 & 29 typically comprise a soft magnetic material and are connected together by a magnetic pad region 77. Main pole layer 80 is formed in an adjacent layered relationship to the adjunct pole; that is, directly on top of adjunct pole 79. The first and second turn layers of coil 90 are shown disposed in respective first and second general planes above and below the general plane of adjunct pole layer 80.

As can be seen from FIG. 13, a recess 78 of nonmagnetic material separates the front edge of adjunct pole 79 from ABS 69. Main pole layer 80, on the other hand, has a write tip 98 that extends substantially to ABS 69. Directly above write tip 98 and substantially coincident with ABS is a layer 82 of magnetic material which contacts an upper layer 83 of magnetic material. Upper layer 83 covers the second layer of turns (C2) of write coil 90. Farther away from ABS 69, and in the same general plane as layer 82, is a layer 81 of magnetic material that connects with layer 83 and the rear or back portion of main pole layer 80.

In accordance with one PMR head embodiment of the present invention, a portion of a resistive heating element 96 is disposed behind a rear edge 97 of, and in the same general plane as, adjunct pole layer 79. By way of example, a front edge 101 of heating element 96 is located approximately 20 µm from ABS 69 in one implementation. Of course, the distance of heating element 96 from ABS 69 may vary depending on design constraints and performance specifications.

It should be understood that in the embodiment described above, the PMR head includes heating element 96 only, not the portion of the heating element 95 which is also shown. Conversely, another embodiment of the PMR head of the present invention includes heating element 95 only, and not heating element 96. In yet another embodiment, the PMR head of the present invention includes both heating elements 95 & 96, which later embodiment will be discussed in more detail shortly. The portion of heating element 95 shown in FIG. 13 is located approximately the same distance from ABS 69 as element 96 of the previous example. Heating element 95 is disposed within nonmagnetic layer 75, which is located between shield layer 74 and first pole layer 76. Regardless of whether the PMR head structure includes optional pole layer 76, heating element 95 is typically disposed in a general plane below that formed by the first layer of turns of coil 90.

Figure 15:
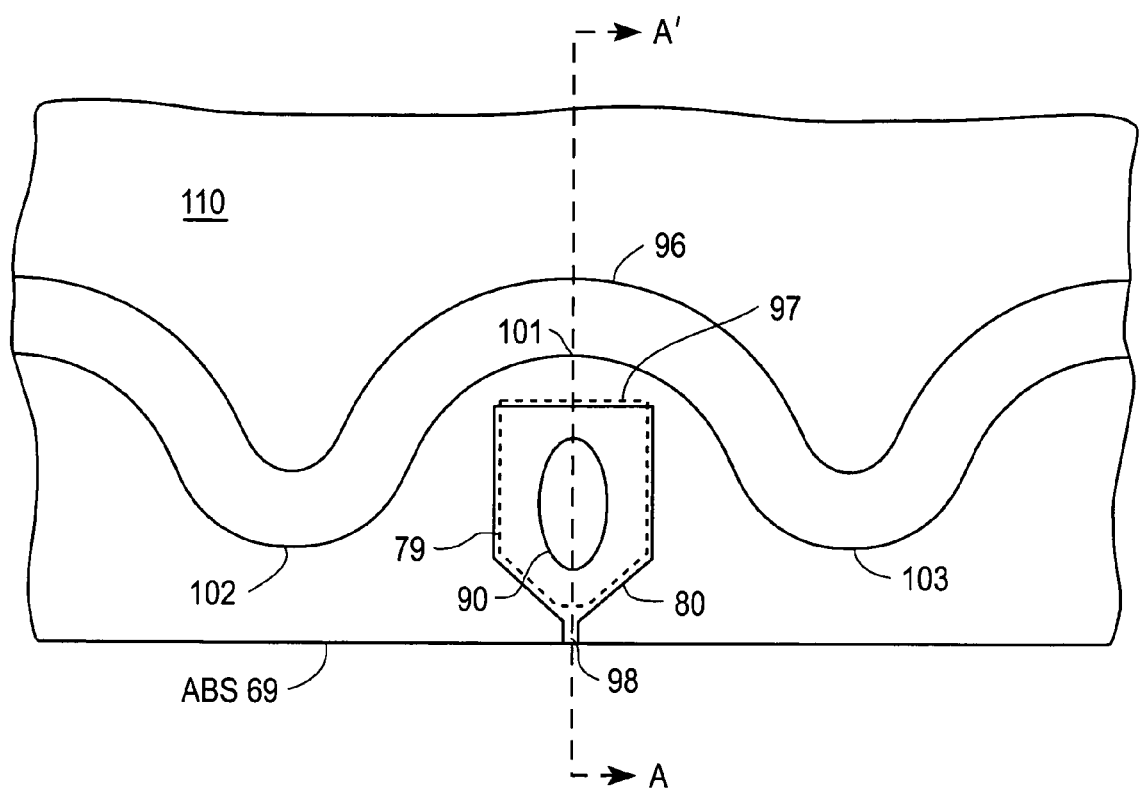
FIG. 15 is a rear side view of a perpendicular magnetic recording head in accordance with one embodiment of the present invention.

FIG. 15 is a rear side view of a thin-film transducer formed on a trailing slider surface 110 in accordance with the PMR head described above. (The cross-section of FIG. 13 is taken through cut lines A-A'. Practitioners in the art will further understand that the oval shaped write coil 90 denoted in FIG. 15 is merely representative of the relative location of one section of the write coil, and not the actual size or dimensions of the entire coil structure.) In the embodiment shown, heating element 96 has a serpentine ("W") pattern with rounded corners that avoid build-up of electric field when current flows to generate heat and thereby cause the main pole and MR element to protrude. (This same pattern may also be used for heating element 95.) In this view, the edge points 102 and 103 of heating element 96 are nearest to ABS 69, with edge point 101 being farther away from ABS 69. In one implementation, points 102 and 103 are each located approximately 5 microns from ABS 69.

Practitioners in the art will appreciate that for the PMR head embodiment described above, a magnetic field is generated near ABS 69 when current flows through heating elements 95 or 96. For instance, due to the relative proximity of heating element 95 to MR element 73, the magnetic field produced at MR element 73 during reading operations with power applied to heating element 95 can be about fifteen times greater than that produced by heating element 96. In accordance with another embodiment of the present invention, this adverse magnetic field may be substantially cancelled by including in the thin-film transducer both heating elements 95 & 96, with the current flow through the respective heating elements being in opposite directions. For example, in FIG. 13 power may be applied to both heating elements 95 & 96 by current flow through heating element 95 in a direction into the page and current flow through heating element 96 in a direction out of the page (or vice-versa). Applying power in this manner not only can cancel or substantially reduce the magnetic field impact at the reader due to the heater, but also may enable smaller currents to be used since two heating elements are utilized rather than one.

Figure 14:
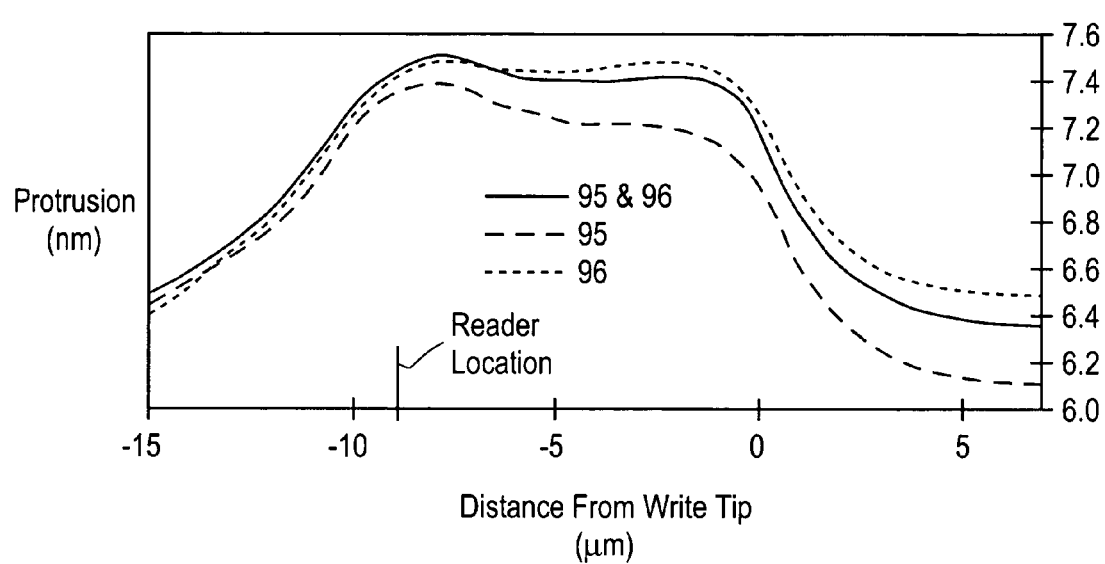
FIG. 14 is a graph that shows protrusion profiles for three different embodiments of the perpendicular magnetic recording head of the present invention.

FIG. 14 is a graph showing protrusion profiles for the three PMR head embodiments described above; that is, with heating element 95 only, with heating element 96 only, and with combined heating elements 95 & 96. Each of the protrusion profile plots was produced using a NiCr resistive material for each of the heating elements, and about 99 mW of applied power. The indicated reader location notation in the figure refers to the location of MR read element 73, which in this particular implementation is about 9 µm below write tip 98. Heating elements 95 and 96 may also be made of other materials, such as tungsten, CuMnNi, or CuNi, in thicknesses and properties described above in connection with the previous embodiments of FIGS. 1-12.

Although the present invention has been described in conjunction with specific exemplary embodiments, those of ordinary skill in the magnetic recording arts will appreciate that numerous modifications and alterations are within the scope of the present invention. Accordingly, the specification and drawings are to be regarded in an illustrative rather than a restrictive sense.

We claim:

1. A magnetic head for perpendicular magnetic recording comprising:
   a slider having an air bearing surface (ABS) and a trailing surface;
   a transducer fabricated on the trailing surface, the transducer including:
      an adjunct pole disposed in a first general plane, the adjunct pole having a front edge that is recessed from the ABS and a rear edge;
      a main pole formed in an adjacent layered relationship to the adjunct pole, the main pole having a write tip that extends approximately to the ABS;
      a write coil having a first layer of turns disposed in a second general plane below the adjunct pole wherein the write coil further includes a second layer of turns disposed in a third general plane above the main pole; and
      a heating element, a portion of the heating element being disposed in the first general plane behind the rear edge of the adjunct pole.

2. The magnetic head of claim 1 wherein the heating element comprises a resistive material consisting essentially of NiCr, CuMnNi, or CuNi.

3. The magnetic head of claim 1 further comprising:
   a first pole disposed in a fourth general plane beneath the first layer of turns of the write coil.

4. The magnetic head of claim 1 wherein the heating element comprises a strip of resistive material that includes a first area, a second area, and the portion, the first and second areas extending near the ABS, with the portion being farther away from the ABS.

5. The magnetic head of claim 1 wherein the main pole is disposed on top of the adjunct pole.

6. The magnetic head of claim 1 wherein the heating element comprises a resistive material having a temperature coefficient of resistivity of about $(1.5/^\circ C.) \times 10^{-4}$ or less.

7. The magnetic head of claim 1 wherein the heating element comprises a resistive material having a coefficient of thermal expansion of about $(2.0/^\circ C.) \times 10^{-5}$ or less.

8. The magnetic head of claim 1 wherein the heating element comprises a resistive material having a thermal conductivity of about 10 W/mK or greater.

9. A magnetic head comprising:
   a slider body having a trailing surface and an air-bearing surface (ABS);
   a magnetic reproducing element fabricated on the trailing surface, the magnetic reproducing element including:
      a magnetoresistive (MR) read element disposed within a gap material bounded by shield material;
   a magnetic recording element fabricated on the trailing surface, the magnetic recording element including:
      an adjunct pole disposed in a first general plane, the adjunct pole having a front edge that is recessed from the ABS and a rear edge located a first distance from the ABS;
      a main pole disposed on top of the adjunct pole, the main pole having a write tip that extends approximately to the ABS;
      a coil having first and second turn layers, the first layer of turns being disposed in a second general plane below the adjunct pole and above the magnetic reproducing element, and the second layer of turns being disposed in a third general plane above the main pole;
   a heating element, a first portion of the heating element being disposed in the first general plane behind the rear edge of the adjunct pole.

10. The magnetic head of claim 9 wherein the heating element further comprises a second portion disposed in a fourth general plane beneath the second general plane and above the shield material of the magnetic recording element.

11. The magnetic head of claim 10 wherein application of power to the heating element causes a protrusion of the main pole and the MR read element, the application of power comprising current flow through the first portion of the heating element in a first direction and through the second portion of the heating element in a second direction opposite to the first direction such that the magnetic fields generated near the ABS by the first and second currents substantially cancel each other.

12. The magnetic head of claim 9 wherein the heating element comprises a resistive material having a temperature coefficient of resistivity of about $(1.5/^\circ C.) \times 10^{-4}$ or less.

13. The magnetic head of claim 9 wherein the heating element comprises a resistive material having a coefficient of thermal expansion of about $(2.0/^\circ C.) \times 10^{-5}$ or less.

14. The magnetic head of claim 9 wherein the heating element comprises a resistive material having a thermal conductivity of about 10 W/mK or greater.

15. The magnetic head of claim 9 wherein the heating element comprises a resistive material consisting essentially of NiCr, CuMnNi, or CuNi.

16. A magnetic head for perpendicular magnetic recording comprising:
   a slider having an air bearing surface (ABS) and a trailing surface;
   a transducer fabricated on the trailing surface, the transducer including:
      an adjunct pole disposed in a first general plane, the adjunct pole having a front edge that is recessed from the ABS and a rear edge;
      a main pole formed in an adjacent layered relationship to the adjunct pole, the main pole having a write tip that extends approximately to the ABS, wherein the main pole is disposed on top of the adjunct pole;
      a write coil having a first layer of turns disposed in a second general plane below the adjunct pole; and
      a heating element, a portion of the heating element being disposed in the first general plane behind the rear edge of the adjunct pole.

17. The magnetic head of claim 16, wherein the write coil further includes a second layer of turns disposed in a third general plane above the main pole and the magnetic head further comprises a first pole disposed in a fourth general plane beneath the first layer of turns of the write coil.

18. The magnetic head of claim 16 wherein the heating element comprises a strip of resistive material that includes a first area, a second area, and the portion, the first and second areas extending near the ABS, with the portion being farther away from the ABS.

19. The magnetic head of claim 16 wherein the heating element comprises a resistive material having a temperature coefficient of resistivity of about $(1.5/^\circ C.) \times 10^{-4}$ or less.

20. The magnetic head of claim 16 wherein the heating element comprises a resistive material having a coefficient of thermal expansion of about $(2.0/^\circ C.) \times 10^{-5}$ or less.

21. The magnetic head of claim 16 wherein the heating element comprises a resistive material having a thermal conductivity of about 10 W/mK or greater.

22. The magnetic head of claim 16 wherein the heating element comprises a resistive material consisting essentially of NiCr, CuMnNi, or CuNi.

* * * * *